United States Patent Office 3,068,227
Patented Dec. 11, 1962

3,068,227
PROCESS OF PREPARING 2,3-DIKETO-5α-STEROIDS
Bruno Camerino, Bianca Patelli, and Roberto Sciaky, all of Milan, Italy, assignors to Società Farmaceutici Italia, Milan, Italy, a corporation of Italy
No Drawing. Filed Jan. 29, 1962, Ser. No. 169,627
Claims priority, application Italy Feb. 10, 1961
15 Claims. (Cl. 260—239.55)

Our invention relates to a process of preparing 2,3-diketo-5α-steroids of the series of androstane, of 19-nor-androstane and of 17α-hydroxy-pregnane substituted or not by a hydroxy group in the 21-position, and to the products obtained thereby.

An object of our invention is the oxidation of 3-keto-5α-steroids of the series of androstane, of 19-nor-androstane and of 17α-hydroxy-pregnane-21 substituted or not by a hydroxyl to 2,3-diketo-5α-steroids with oxygen or air, in the presence of potassium salt of a tertiary aliphatic alcohol according to the following reaction scheme:

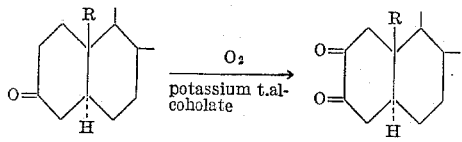

wherein R is hydrogen or methyl.

Some 2,3-diketo-5α-steroids and their methods of preparation are known in the literature. For example, cholestane-2,3-dione has been prepared by E. T. Stiller and O. Rosenheim (J. Chem. Soc., 1938, page 353), by treating cholestane-3-one with a large excess of selenium dioxide (ratio by weight steroid: $SeO_2$=1:8). 5α-androstane-2,3,17-trione has been prepared by C. Djerassi, R. Yashin and G. Rosenkranz (J. Am. Chem. Soc. 72, 1950, page 5750) according to the method of F. Kröhnke (Ber. 69, 1936, page 2006) consisting in the following four steps:

Reacting 5α-androstane-3,17-dione with bromine to yield 2-bromo-5α-androstane-3,17-dione, which in turn is reacted with pyridine to yield the pyridic complex, which when treated with p.nitrous-dimethyl-aniline yields the corresponding 2-nitrone from which, by acid hydrolysis, 5α-androstane-2,3,17-trione is obtained. These processes reported in the literature either have the disadvantage of affording low yields or involve several steps.

It is the object of our invention to prepare 2,3-diketo-5α-steroids from the corresponding 3-keto-5α-steroids known in the literature by a one-step process utilizing an inexpensive reagent.

Our invention provides a process of preparing a 2,3-diketo-5α-steroid wherein the corresponding 3-keto-5α-steroid dissolved in a tertiary aliphatic alcohol is treated with oxygen in the presence of an alkali metal salt of a tertiary aliphatic alcohol at from 10° to 50° C. The 3-keto-5α-steroids are preferably of the androstane, 19-nor-androstane or 17α-hydroxy-pregnane series, substituted or not by a hydroxy group in the 21-position. If a dioxyacetonic chain is present in the 17-position as protection against oxidation of the side chain, either a 17,20,20,21-bismethylenedioxy or substituted bismethylenedioxy group such as bisethylenedioxy, -bispropionaldioxy, -bisbutyraldioxy or -biscaproaldioxy (prepared as described by R. E. Beyler et al. in U.S. Patents Nos. 2,888,456 and 2,888,457) must be used.

Preferred tertiary aliphatic alcohols are tertiary butyl alcohol and tertiary amyl alcohol and the preferred alkali metal salt is the potassium salt. Operation is preferably at room temperature over a period of from a few hours to several (usually 1 or 2) days, the course of the reaction being followed by the movement of the maximum U.V. absorption bands.

When the treatment is over, the reaction mixture is neutralized either with an organic acid, such as acetic acid, or a dilute inorganic acid and then diluted with water. The steroid is extracted with an organic solvent immiscible with water.

The resulting crude 2,3-diketo-5α-steroids, may be isolated in pure form, either by recrystallization from an organic solvent, or by chromatography on absorbent substances, such as Florisil, an activated magnesium silicate, followed by elution and recrystallization. The bismethylenedioxy or substituted -bismethylenedioxy groups of the resulting 2,3-diketo-5α-steroids of the 17α,21-dihydroxy-pregnane series may be hydrolyzed in the usual way (R. E. Beyler et al.; U.S. Patent No. 2,866,799), with aqueous acids, such as sulfuric acid, hydrochloric acid, formic acid or acetic acid. The resulting primary and secondary hydroxy groups of the 2,3-diketo-5α-steroids may be acylated with a chloride or an anhydride of an organic acid in the optional presence of a tertiary amine. In these conditions the keto group in 2-position of the steroid is enolized and then acetylated.

Oxidation in 2-position of the steroid according to the invention may be obtained either with atmospheric oxygen or with pure oxygen which may either be passed into the solution, or reacted at the surface, by static contact, by leaving the steroid solution in a large open container. The molar ratio t.potassium alcoholate:steroid may vary from 1:1 to 1:30 and is preferably between 1:3 and 1:10.

According to the process of the invention, 17α-methyl-5α-androstane-17β-ol-2,3 - dione, 19-nor - 5α - androstane-17β-ol-2,3-dione, 5α-pregnane - 11β,17α,21 - triol - 2,3,20-trione and 9α-fluoro-5α-pregnane-11β,17α,21-triol-2,3,20-trione have been prepared.

The 2,3-diketo-5α-steroids of the invention are physiologically active substance. Some of them have hormonal activity as anabolic, androgenic, progestative, antiinflammatory or natriuretic substances while others are active on the central nervous system and have hypotensive activity.

The following examples illustrate, but are not intended to limit, the invention.

EXAMPLE 1

*17α-Methyl-5α-Androstane-17β-ol-2,3-Dione*

2 g. of 17α-methyl-5α-androstane-17β-ol-3-one (prepared as described by L. Ruzicka, M. W. Goldberg and H. R. Rosenberg: Helv. Chim. Acta, 1935, 18, page 1487) were dissolved in 80 cc. of butanol. A solution of potassium t.butylate prepared by dissolving 0.9 g. of metallic potassium in 30 cc. of t.butanol was added thereto. The mixture was allowed to react at room temperature for 36–40 hours, its course being followed by U.V. spectroscopic examination. An absorption maximum appeared at about 268–270 mμ. When the intensity of such maximum had become constant, 1.2 cc. of acetic acid were added, the solution was diluted with ethyl acetate and poured into a solution of sodium chloride saturated at 15° C. The organic extract was washed with a 5% aqueous solution of sodium carbonate and then with water to neutrality. The solution was dried and evaporated to dryness under vacuum. The residue was chromatographed on Florisil and eluted with benzene-ether in a volumetric ratio 8:2. It was finally dried and recrystallized from acetone-petroleum ether.

17α-methyl-5α-androstane-17β-ol-2,3-dione, melting at 183–184° C., was obtained which gave a red coloration with ferric chloride.

$\lambda_{max.}^{ethanol}$ at 270 mμ ($\epsilon$=7900)

The same results were obtained by blowing oxygen or air into the solution instead of allowing air to act at the surface.

EXAMPLE 2

19-Nor-5α-Androstane-17β-Ol-2,3-Dione 1 g. of 19-nor-5α-androstan-17β-ol-3-one (prepared according to A. Bowers, H. J. Ringold and E. Denot: J. Amer. Chem. Soc., 1958, 80, page 6115) were dissolved in 40 cc. of t.butanol, a potassium t.butylate solution prepared from 0.45 g. of metallic potassium in 15 cc. of t.butanol was added and the reaction was allowed to proceed at room temperature; its course being followed by U.V. spectroscopic examination. After 24 hours a maximum appeared at about 270 m$\mu$ which did not increase. The solution was neutralized with acetic acid, diluted with ethyl acetate, then poured into a saturated aqueous solution (at 15° C.) of sodium chloride. The organic extract was washed with a 5% aqueous solution of sodium bicarbonate and with water to neutrality. It was dried over anhydrous sodium sulfate and evaporated to dryness under vacuum: the crude product absorbed U.V. radiation at 270 m$\mu$ and gave a red coloration with ferric chloride. The residue was dissolved in benzene and chromatographed over Florisil. The product was eluted with benzene: ethyl ether in volumetric ratio 9:1. The solution was evaporated to dryness under vacuum and the residue was recrystallized from ethyl ether to obtain 19-nor-5α-androstane-17β-ol-2,3-dione melting at 135–140° C.

$\lambda_{max.}^{ethanol}$ at 270 m$\mu$ 19-nor-5α-androstane-17β-ol-2,3-dione dissolved in 5 parts of pyridine and heated for an hour on a boiling water bath with 1 part of acetic anhydride yielded 19-nor-Δ¹-5α-androstane-2,17β-diol-diacetate melting at 158–162° C.

$\lambda_{max.}^{ethanol}$ at 237 m$\mu$ ($\epsilon$=8700)

EXAMPLE 3

5α-Pregnane-11β,17α,21-Triol-2,3,20-Trione 5 g. of 5α-pregnane-11β,17α,21-triol-3,20-dione-21-acetate (prepare according to J. Pataki, G. Rosenkranz and C. Djerassi: J. Biol. Chem., 1952, 195, page 751) were stirred at room temperature in a nitrogen stream for 5 minutes with 1.25 g. of potassium hydroxide dissolved in 10 cc. of water. The solution was acidified with acetic acid, poured into an aqueous solution of sodium chloride saturated at 15° C. and extracted with ethyl acetate. The extracts were washed with sodium chloride solution, with a solution of sodium bicarbonate saturated at 20° C. and with water to neutrality. A residue (4 g.) of 5α-pregnane-11β,17α,21-triol-3,20-dione remained after distillation of the solvent. This was dissolved in 160 cc. of chloroform and stirred for 3 hours at room temperature with 43 cc. of concentrated hydrochloric acid and 43 cc. of 40% formaldehyde solution. The chloroform layer was separated, successively washed with water, a solution of sodium bicarbonate saturated at 20° C. and water to neutrality. After distillation of the solvent 4.6 g. of crude product remained from which, by addition of ether, 1.4 g. of 17α,20,20,21-bismethylenedioxy-5α-pregnane-11β-ol-3-one melting at 235–240° C. crystallized out.

1 g. of this product in 40 cc. of t.butanol was left in an open container for 2 days with 15 cc. of t.butanol containing 0.45 g. of potassium. The solution was then acidified with acetic acid, diluted with a solution of sodium chloride saturated at 15° C. and extracted with ethyl acetate. The extracts were washed with salty water, with 2 N sodium hydroxide solution and with water to neutrality. After solvent distillation and recrystallization from acetone-petroleum ether, 17α,20,20,21-bismethylenedioxy-5α-pregnane-11β-ol-2,3-dione were obtained, melting at 260–262° C.

$\lambda_{max.}^{ethanol}$ at 267 m$\mu$ ($\epsilon$=9340), $[\alpha]_D^{20} = -38°$ (c.=1 in chloroform)

The proceeding product was saponified with 60% aqueous formic acid at 100° C., yielding 5α-pregnane-11β,17α,21-triol-2,3,20-trione-21-formate (M.P. 150–155° C.:

$\lambda_{max.}^{ethanol}$ at 270 m$\mu$)

Further saponification with alkali yielded 5α-pregnane-11β,17α,21-triol-2,3,20-trione.

EXAMPLE 4

9α-Fluoro-5α-Pregnane-11β,17α,21-Triol-2,3,20-Trione

To 4.4 g. of 9α-fluoro-bismethylenedioxy-hydrocortisone (prepared as described by Beyler et al. U.S. Patent Nos. 2,888,456 and 2,888,457) dissolved in 550 cc. of dioxane, there were added 5 cc. of triethylamine and 0.5 g. of 10% palladium on charcoal. Hydrogenation followed in a glass vessel at room temperature and atmospheric pressure. After filtration and distillation of the solvent under vacuum, the residue is recrystallized from acetone. 3.11 g. of 17α,20,20,21 - bismethylenedioxy - 5α-pregnane-9α-fluoro-11β-ol-3-one were collected, melting at 288° C. $[\alpha]_D^{21°} = -64°$ (c.=1 in chloroform).

0.350 g. of 17α,20,20,21-bismethylenedioxy - 5α - pregnane-9α-fluoro-11β-ol-3-one in 20 cc. of t.butanol with addition of 8 cc. of butanol containing 0.25 g. of potassium were allowed to stand in an open container at room temperature for three days. After acidification of the solution with acetic acid an aqueous solution of sodium chloride, saturated at 15° C., was added. The solution was extracted with ethyl acetate. The extracts were washed with salty water, with a solution of sodium bicarbonate saturated at 20° C. and with water to neutrality. After distillation of the solvent there remained 0.250 g. of crude product which upon crystallization from methanol yielded 0.100 g. of 17α,20,20,21-bismethylenedioxy-5α-pregnane-9α-fluoro-11β-ol-2,3-dione, melting at 290–292° C.;

$\lambda_{max.}^{ethanol}$ at 267 m$\mu$ ($\epsilon$=8.361), $[\alpha]_D^{20°} = -20°$ (c.=1 in chloroform)

0.500 g. of 17α,20,20,21-bismethylenedioxy-5α-pregnane-9α-fluoro-11β-ol-2,3-dione were refluxed for 1 hour and 15 minutes with 50 cc. of 60% formic acid. The solution was concentrated under vacuum, the residue was dissolved in ethyl acetate, washed with water, with a solution of sodium bicarbonate, saturated at 20° C., and with water to neutrality. After distillation of the solvent, 0.400 g. of crude product remained, which, recrystallized from petroleum ether-acetone yielded 9α-fluoro-5α-pregnane-11β,17α-21-triol-2,3,20-trione melting at 228–230° C.;

$\lambda_{max.}^{ethanol}$ at 267 m$\mu$ ($\epsilon$=8.464)

Obviously, many modifications and variations of the present invention are possible in the light of the above teachings. It is therefore to be understood that within the scope of the appended claims, the invention may be practiced otherwise than as specifically described.

We claim:

1. A process of preparing 2,3-diketo-5α-steroids of the series of androstane, of 19-nor-androstane and of 17α-hydroxy-pregnanes, which comprises reacting the corresponding 3-keto-5α-steroid with oxygen in a tertiary aliphatic alcohol in the presence of the potassium salt of a tertiary aliphatic alcohol and purifying the resulting 2,3-diketo-5α-steroid.

2. A process of preparing 2,3-diketo-5α-steroids of the series of androstane, of 19-nor-androstane and of 17α-hydroxy-pregnanes, which comprises dissolving the corresponding 3-keto-5α-steroid in a tertiary aliphatic alcohol, reacting the steroid solution with oxygen, in the presence of the potassium salt of a tertiary alcohol, in a molar ratio of potassium alcoholate to steroid from 1:1 to 1:30, at atmospheric pressure and at temperatures between 10 to 50° C., and recovering the resulting 2,3-diketo-5α-steroid.

3. A process of preparing 2,3-diketo-5α-steroids of the series of androstane, of 19-nor-androstane and of 17α-hydroxy-pregnanes, which comprises dissolving the corresponding 3-keto-5α-steroid in a tertiary aliphatic alcohol, selected from the group consisting of tertiary butyl and tertiary butyl alcohol, reacting the steroid solution with oxygen in the presence of the potassium salt of a tertiary alcohol selected from the group consisting of potassium t.butylate and potassium t.amylate, in a molar ratio of potassium alcoholate to steroid from 1:3 to 1:10, at atmospheric pressure and room temperature for about 1-2 days, and recovering the resulting 2,3-diketo-5α-steroid.

4. A process of preparing 2,3-diketo-5α-steroids of the series of androstane, of 19-nor-androstane and of 17α-hydroxy-pregnanes, which comprises dissolving the corresponding 3-keto-5α-steroid in a tertiary aliphatic alcohol, selected from the group consisting of tertiary butyl and tertiary butyl alcohol, reacting the steroid solution with oxygen by blowing carbon dioxide-and-moisture-free oxygen in said steroid solution, in the presence of the potassium salt of a tertiary alcohol selected from the group consisting of potassium t.butylate and potassium t.amylate, in a molar ratio of potassium alcoholate to steroid from 1:3 to 1:10, at atmospheric pressure and room temperature for about 1-2 days, and recovering the resulting 2,3-diketo-5α-steroid.

5. A process of preparing 5α-pregnane-11β,17α,21-triol-2,3,20-trione, which comprises acidifying 5α-pregnane-11β,17α,21-triol,3,20-dione with hydrochloric acid in formaldehyde solution to yield 17α,20,20,21-bismethylenedioxy-5α-pregnane-11β-ol-3-one, dissolving said 17α,20,20,21-bismethylenedioxy-5α-pregnane-11β-ol-3-one in a tertiary alcohol, reacting the steroid solution with oxygen, in the presence of the potassium salt of a tertiary alcohol selected from the group consisting of potassium t.butylate and potassium t.amylate, in a molar ratio of potassium alcoholate to steroid from 1:3 to 1:10 at atmospheric pressure and room temperature to yield in turn 17α,20,20,21-bismethylenedioxy-5α-pregnane-11β-ol-2,3-dione and saponifying said 17α,20,20,21-bismethylenedioxy-5α-pregnane-11β-ol-2,3-dione to yield 5α-pregnane-11β,17α,21-triol-2,3,20-trione.

6. A process of preparing 9α-fluoro-5α-pregnane-11β,17α,21-triol-2,3,20-trione, which comprises reacting 17α,20,20,21 - bismethylenedioxy - 5α - pregnane - 9α - fluoro-11β-ol-3-one dissolved in a tertiary alcohol, reacting the steroid solution with oxygen, in the presence of the potassium salt of a tertiary alcohol selected from the group consisting of potassium t.butylate and potassium t.amylate, in a molar ratio of potassium alcoholate to steroid from 1:3 to 1:10 at atmospheric pressure and room temperature, to yield 17α,20,20,21-bismethylenedioxy-5α-pregnane-9α-fluoro-11β-ol-2,3-dione, reacting said 17α,20,20,21 - bismethylenedioxy - 5α - pregnane - 9α - fluoro - 11β-ol-2,3-dione with formic acid to yield 9α-fluoro-5α-pregnane-11β,17α,21-triol-2,3,20-trione.

7. A process of preparing 17α-methyl-5α-androstane-17β-ol-2,3-dione which comprises reacting 17α-methyl-5α-androstane-17β-ol-3-one dissolved in a tertiary alcohol, reacting the steroid solution with oxygen, in the presence of the potassium salt of a tertiary alcohol selected from the group consisting of potassium t.butylate and potassium t.amylate, in a molar ratio of potassium alcoholate to steroid from 1:3 to 1:10 at atmospheric pressure and room temperature.

8. A process of preparing 19-nor-5α-androstane-17β-ol-2,3-dione which comprises reacting 19-nor-5α-androstane-17β-ol-3-one dissolved in a tertiary alcohol, reacting the steroid solution with oxygen, in the presence of the potassium salt of a tertiary alcohol selected from the group consisting of potassium t.butylate and potassium t.amylate, in a molar ratio of potassium alcoholate to steroid from 1:3 to 1:10 at atmospheric pressure and room temperature.

9. 17α-methyl-5α-androstane-17β-ol-2,3-dione.

10. 19-nor-5α-androstane-17β-ol-2,3-dione.

11. 17α,20,20,21 - bismethylenedioxy - 5α - pregnane-11β-ol-2,3-dione.

12. 5α - pregnane - 11β,17α,21 - triol - 2,3,20 - trione-21-formate.

13. 5α-pregnane-11β,17α,21-triol-2,3,20-trione.

14. 17α,20,20,21 - bismethylenedioxy - 5α - pregnane-9α-fluoro-11β-ol-2,3-dione.

15. 9α - fluoro - 5α - pregnane - 11β,17α,21 - triol - 2,3,20-trione.

No references cited.